June 7, 1932.   A. L. LILLY   1,861,539
CASTER
Filed Nov. 10, 1930
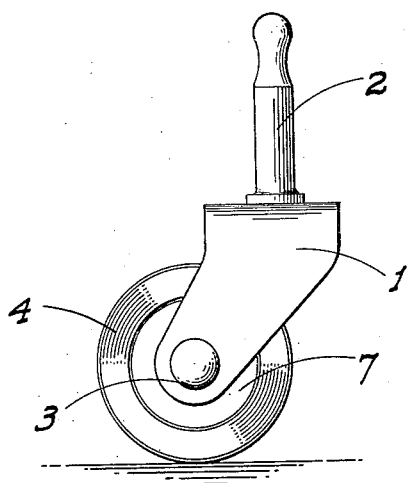
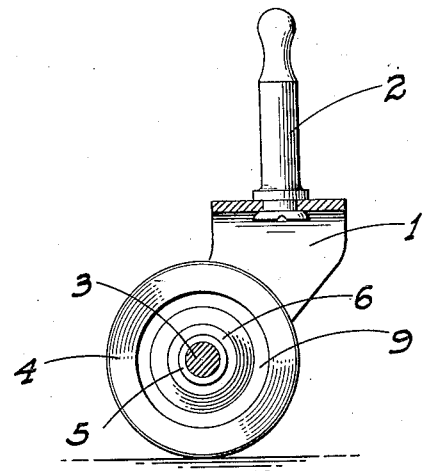
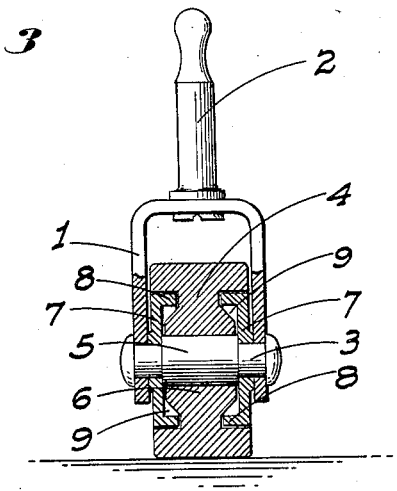
INVENTOR
A. L. Lilly
BY
ATTORNEY Patented June 7, 1932

1,861,539

UNITED STATES PATENT OFFICE

ALVA L. LILLY, OF BURLINGAME, CALIFORNIA, ASSIGNOR OF ONE-FOURTH TO HAZEL B. LOOMAN, OF BURLINGAME, CALIFORNIA

CASTER

Application filed November 10, 1930. Serial No. 494,499.

This invention relates to swivel-casters for movable pieces of furniture and the like, the principal object being to provide an article of this general character which eliminates the possibility of the caster picking up ravelings, string, hair, and the like from the floor or its coverings and which with the present type of caster are apt to become entangled with the caster-spindle and cause the caster wheel to jam and refuse to turn.

A further object of the invention is to produce a simple and inexpensive device and yet one which will be exceedingly effective for the purpose for which it is designed.

These objects I accomplish by means of such structure and relative arrangement of parts, as will fully appear by a perusal of the following specification and claims.

In the drawing similar characters of reference indicate corresponding parts in the several views:

Fig. 1 is a side elevation of my improved caster.

Fig. 2 is a similar view showing the supporting frame in section and with one of the wheel heads removed.

Fig. 3 is a transverse vertical section of the caster.

Referring now more particularly to the characters of reference on the drawing, the caster comprises a substantially U-shaped frame 1 of the usual form having an upstanding spindle 2 whereby the frame may be swivelly mounted on the structure being supported. A stationary spindle 3 extends between and is riveted or otherwise rigidly secured to the side plates of the frame. The spindle projects through the caster wheel 4 and intermediate its end is provided with an enlarged circular portion 5 which is concentric with the end portions and turnably engages the hub 6 of the wheel. The hub engages the portion 5 for almost the entire length of the latter and is symmetrically disposed relative to but is narrower than the tread of the wheel which approaches close to the frame sides.

Mounted on the spindle outwardly of the hub and the enlarged portion 4 are disc-like heads 7 which are of smaller diameter than the wheel and are countersunk therein so as to be flush therewith on their outer faces.

At their outer peripheries the heads are provided with internal annular flanges 8 which ride in sockets or depressions 9 provided in the wheel outwardly of the hub. These flanges increase the width of the adjacent faces of the wheel and heads and thereby aid in preventing the possible passage of foreign matter therebetween.

When the parts of the caster are assembled the heads are clamped between the shoulders formed at the ends of the enlarged spindle portion 4 and the sides of the frame, by the riveting of the spindle, so that said heads cannot turn. The hub of the wheel however is of slightly lesser length than said portion 4 so that it is not bound or engaged by the adjacent faces of the heads and the flanges 8 have a running fit in the wheel recesses. As a result of this construction the wheel is free to turn, but there is no danger of any foreign matter finding its way to the spindle at the hub to prevent free rotation of the wheel.

From the foregoing description it will be readily seen that I have produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A caster comprising a supporting frame having spaced side plates, a spindle fixed in and extending between the plates, a caster wheel having a hub narrower than the tread of the wheel turnably engaging the spindle, and heads on and fixed with the spindle disposed between the plates and hub and countersunk in the wheel.

2. A caster comprising a supporting frame having spaced side plates, a spindle fixed in and extending between the plates, an enlarged portion on the spindle intermediate its ends, a caster wheel wider than said enlarged portion having a hub slightly shorter than said portion and turnably engaging the same, and heads on the spindle between and clamped against the frame plates and the ends of the enlarged spindle portion; said heads being of smaller diameter than the wheel and being countersunk therein.

3. A caster comprising a supporting frame having spaced side plates, a spindle fixed in and extending between the plates, a caster wheel having a hub turnably engaging the spindle, heads on and fixed with the spindle disposed between the plates and hub, and annular flanges projecting inwardly from the heads about their peripheries; the wheel being recessed in its sides to a diameter and to a depth sufficient to receive the heads and their flanges.

In testimony whereof I affix my signature.

ALVA L. LILLY.